March 3, 1936.  J. J. HANLEY  2,033,071
RECTIFYING APPARATUS
Filed Nov. 18, 1933   2 Sheets-Sheet 1
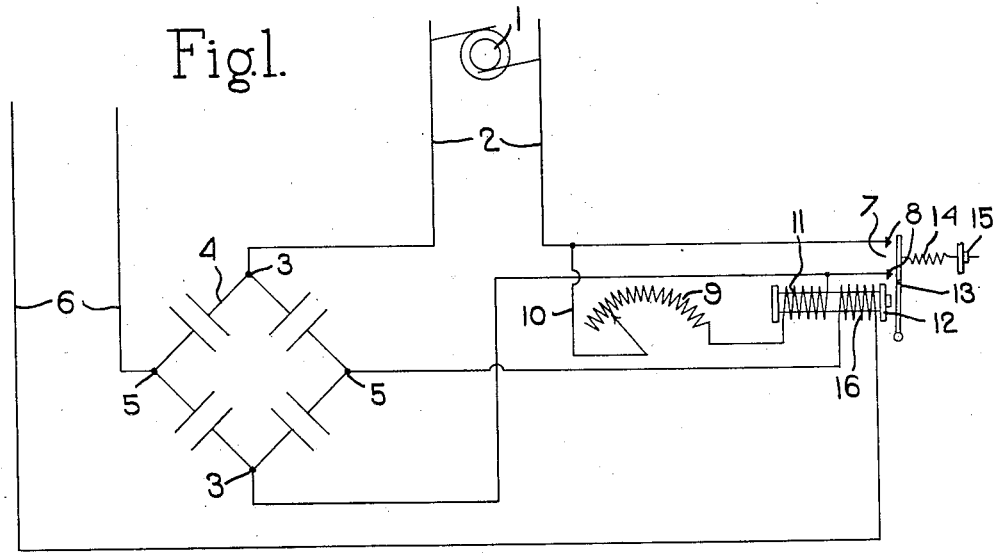
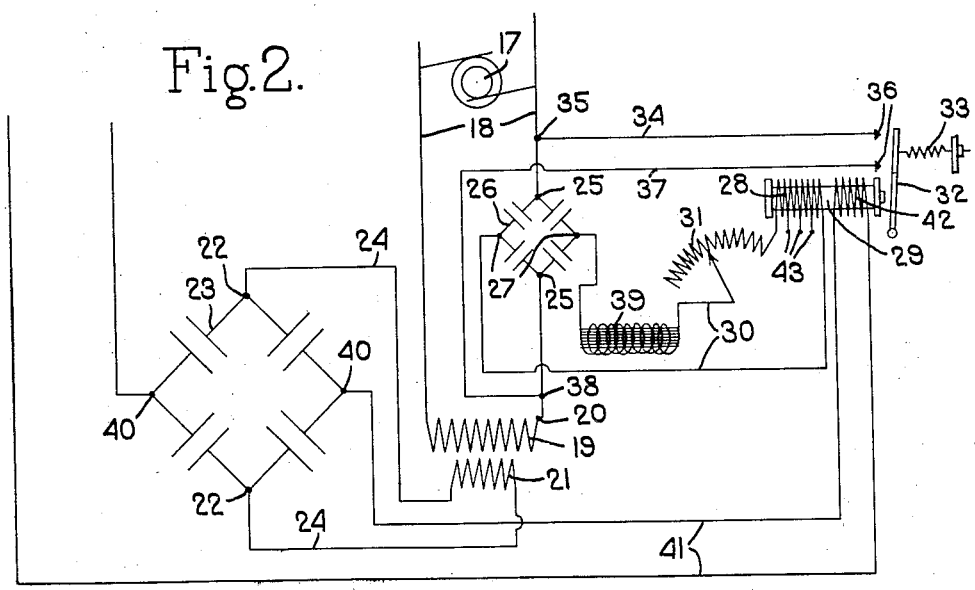
Inventor.
John J. Hanley
by Heard Smith & Tennant.
Attys.

March 3, 1936.  J. J. HANLEY  2,033,071
RECTIFYING APPARATUS
Filed Nov. 18, 1933  2 Sheets-Sheet 2

Inventor.
John J. Hanley
by Heard Smith & Tennant.
Attys.

Patented Mar. 3, 1936

2,033,071

UNITED STATES PATENT OFFICE 2,033,071

RECTIFYING APPARATUS

John J. Hanley, Jamaica Plain, Mass.; Thomas F. Haley, Boston, Mass., executor of said John J. Hanley, deceased Application November 18, 1933, Serial No. 698,662

9 Claims. (Cl. 175—363)

This invention relates to rectifying apparatus and particularly to such apparatus employing a rectifier system comprising dry metallic plates in contact.

The principal object of the invention is to protect the plates of the rectifier system from damage caused by the continued application of excessive voltage thereto.

The object of the invention is further to provide automatic means for maintaining the input voltage on the rectifier system within predetermined safe limits when the load is de-energized or when the load current is so reduced as to otherwise cause a destructive voltage to be impressed upon the rectifier system.

A further object of the invention is to provide an apparatus of the character above set forth which is manually adjustable to vary the voltage impressed upon the rectifier system when the load is de-energized or the load current substantially reduced.

The object of the invention is further to provide automatic switching means deriving current from the input circuit of the apparatus and acting to protect the rectifier system from the application of excessive voltage during the period of time when the load is de-energized or the load current substantially reduced.

The object of the invention is further to provide in an automatic switching device for rendering the voltage reducing means effective or ineffective a means for insuring its positive operation and rendering it responsive to accurately predetermined requirements.

The present invention is applicable to an installation of full wave dry contact type rectifiers designed to supply a predetermined load with direct current where the load is de-energized for appreciable periods of time while current is continuously supplied to the input of the rectifier system. Under such conditions, due to the electrical characteristics of the rectifier, a destructive alternating current voltage is impressed upon the plates thereof. If such voltage is allowed to remain impressed upon the rectifier system for an appreciable period of time, the life of the plates in the rectifier system is greatly shortened. Accordingly, it will be understood by those skilled in the art that it is necessary properly to design rectifier systems of the type referred to for a particular load with which they are to be used and according to the input voltage available, and unless some means is provided to protect the rectifier it will, therefore, be subjected to excessive voltage when the load is de-energized or the load current substantially reduced.

There are many instances where it becomes highly desirable or it is found more practical to control manually the output circuit of a rectifier system of the type herein presented while the input circuit remains closed and the voltage which the input circuit applies to the rectifier system is rendered automatically responsive to the energization of the load or the de-energization of the load or a substantial reduction in the load current.

One such installation is employed in motion picture projection to supply the arc-lights of the projection machines with direct current. In such installations, the rectifiers are remotely situated from the projection booth and it becomes a complicated matter to control the arc-lamps by manual switches in the input circuit. Long lines of wire must be led to the booth to enable the operator to accomplish this result. Owing to the lack of space in the booth and to many other reasons, it becomes impractical to install the rectifiers in the booths.

The present invention provides voltage reducing means, such as ohmic resistance, reactance, a combination of both of the foregoing, or a transformer which acts to reduce the voltage applied to the rectifier system when the load is de-energized or a substantial drop in the load current occurs. Under the broad scope of the invention, any automatic means may be employed to render ineffective the voltage reducing element when the load is energized or a substantial increase in the load current occurs, the same means acting to render the voltage reducing means effective when the load is de-energized or a substantial reduction in the load current occurs.

The invention is also particularly adapted to installations in which a small current must be continuously maintained such as in certain signalling systems or fire alarm systems. In such systems the rectifier must be immediately available to supply a greatly increased flow of current. In this type of installation the low continuous current may be only a few milliamperes in volume. The apparatus shown in Fig. 1 is particularly adapted to supply the needs of such an installation. The small input current continuously flowing in this apparatus is sufficient to supply the requirements of the low output current. Such current would not be sufficient to actuate the relay switch.

Additional features of the invention are provided as follows. In most instances the apparatus is designed for properly protecting the rectifier system when the system is designed for supplying a load current of substantially constant predetermined amount. In order to adapt the apparatus to a load of different current requirement within restricted limits, a manual adjustment may be provided for varying the amount which the voltage reducing means reduces the voltage of the source of current.

The rectifier system may be divided into a main section and an auxiliary section, in which case the auxiliary section has a low current capacity and is constantly supplied with input current. The output current of the auxiliary section is fed to the load circuit and also acts to energize automatic means acting to control the energization or de-energization of the main rectifier section respectively as the load is energized or de-energized.

In the drawings:

Fig. 1 is a diagrammatic illustration of a preferred form of the apparatus.

Fig. 2 is a diagrammatic illustration of another form of the apparatus.

Figure 3:
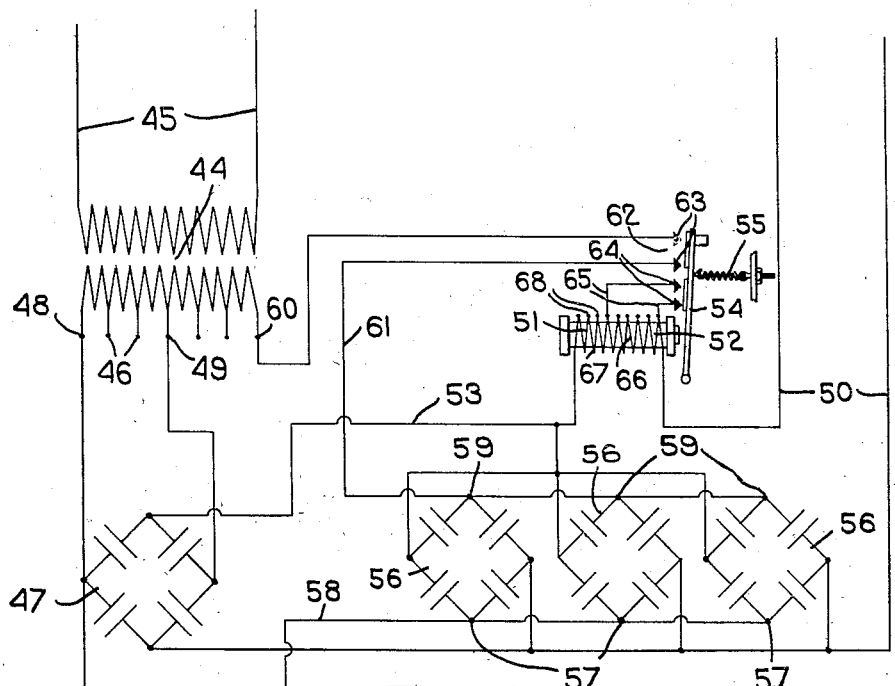
Figs. 3 and 4 are diagrammatic illustrations of other arrangements of the elements included in the broad scope of the invention.

A preferred embodiment of the invention is illustrated in the drawings in which an alternating current source 1 supplies current to the input circuit 2. The input circuit 2 is connected to the input terminals 3 of the rectifier 4. The output terminals 5 of the rectifier are connected to the output circuit 6 which acts to conduct the rectified current to a load. The input circuit 2 is interrupted at 7 and the ends of the circuit are connected to contact points 8. At no load or very light load the circuit 2 is open at 7. An adjustable resistance 9 is connected across the point of interruption of the input circuit at 7 through the circuit 10. Within the circuit 10 is also situated the winding 11 of a relay switch 12. At no load or light load the current flowing in the input circuit 2 is relatively small and the voltage impressed upon the input terminals 3 at this time may be adjusted by means of the adjustable resistance 9. At this time the current flowing in the winding 11 is less than is required to draw the armature 13 of the relay switch against the contacts 8. The armature is held in open circuit position by means of the spring 14, the tension of which is adjustable by means of the adjusting nut 15.

When the load is connected to the output circuit 6, an increase in current immediately takes place in the input circuit 2, which current also flows in the circuit 10 and through the winding 11 energizes the relay switch sufficiently to cause its armature to close the circuit 2 at the point 7, thus short-circuiting the resistance 9 and the winding 11. In order to insure that the armature 13 of the relay switch will maintain the input circuit closed, a second winding 16 is situated upon the relay and is connected in series in the output circuit 6. The current flowing to the load, therefore, acts to maintain the armature 13 in its closed circuit position until such time as the load is de-energized or the current in the output circuit drops substantially.

To adjust the apparatus, the load is de-energized while the source is connected to the rectifier and the resistance 9 is adjusted to produce the desired voltage at the terminals 3 or any voltage may be established at this point by adjustment of the resistance. The relay switch 12, thereafter, acts to maintain a desired voltage at the terminals 3 of the rectifier at all times and thereby insures maximum life of the plates of which the rectifier is composed.

Another form of the invention is shown in Fig. 2 in which an alternating current source 17 supplies current to the input circuit 18. The input circuit 18 is connected to the primary 19 of a transformer 20. The secondary 21 of the transformer 20 is connected to the input terminals 22 of the rectifier 23. In this form of the invention the transformer 20 is inserted to change the voltage applied to the rectifier in case the voltage available at the commercial circuit is not of the proper value. The input circuit 18 may now be considered to include the transformer and the wires 24 leading from the transformer to the rectifier. The input circuit 18 may be interrupted either on the primary side of the transformer or on the secondary side of the transformer. As shown herein, the circuit is interrupted on the primary side of the transformer.

The input terminals 25 of an auxiliary rectifier 26 are connected in series in the circuit 18. The output terminals 27 of the rectifier are connected to a winding 28 upon the relay switch 29 through a circuit 30. A variable resistance 31 is connected in series in the circuit 30. The switch 29 is provided with an armature 32 held in open circuit position by a spring 33, the tension of which is adjustable. A wire 34 is connected at one of its ends to the circuit 18 at 35 and at its other end to one of a pair of contacts 36 upon the relay 29. Another wire 37 is connected at one end to the circuit 18 at 38 and at its other end to the other contact 36. The wires 34 and 37 constitute a by-pass circuit around the rectifier 26. When the armature 32 of the switch makes contact with the contacts 36, the rectifier 26 becomes short-circuited. If desired, a smoothing coil 39 may be inserted in the circuit 30 to eliminate the current ripple set up by the rectifier. It will be noted in this form of the invention that the independent auxiliary rectifier 26 acts as a resistance to reduce the voltage impressed upon the main rectifier and also acts to supply direct current to the circuit 30.

The output terminals 40 of the rectifier 23 are connected to an output circuit 41 which is connected to the load. Another coil 42 upon the relay 29 is connected in series in the circuit 41. Assuming that the source 17 is constantly supplying current to the rectifier 23 and that there is no load or a very light load current flowing in the circuit 41, the following conditions prevail in the apparatus. The rectifier 26 is supplying current to the winding 28 upon the relay switch. The amount of this current is determined by the adjustment of the variable resistance 31 and the other elements included in the circuit. A small current is thereby caused to flow in the input circuit 18 and thus a voltage is impressed upon the input terminals 22 of the rectifier 23 through the transformer 19. By means of the adjustable resistance 30 this impressed voltage may be set at a value equal to the impressed voltage on the terminals 22 at full load or it may be set at any desired value. It will be noted that in this form of the apparatus the winding 28 is supplied with direct current. By supplying the relay with direct current its function is somewhat improved over that which it would have if it were supplied with alternating current. It has been found, however, that the apparatus will function properly without the rectifier 26. The spring 33 on the relay 29 is so adjusted that the current flowing in the winding 28 at no load or light load is insufficient to move the armature into closed circuit position. When, however, the load is energized, current in the circuit 30 is greatly increased and the armature 32 is attracted into closed circuit position, thereby short-circuiting the rectifier 26. Since current now flows in the circuit 41, the winding 42 is energized and acts to maintain the armature 32 in its closed position until the load is again de-energized. It will be understood that other forms of switches than the relay switches herein described may be used to produce the same result.

The winding 28 upon the relay 29 may be provided with a plurality of taps 43. By making connection to a selected tap 43, a desired portion of the winding 23 may be included in the circuit 30, thereby providing an adjustment in addition to the adjustable spring 33 for regulating the sensitiveness of the relay 29.

Figure 4:
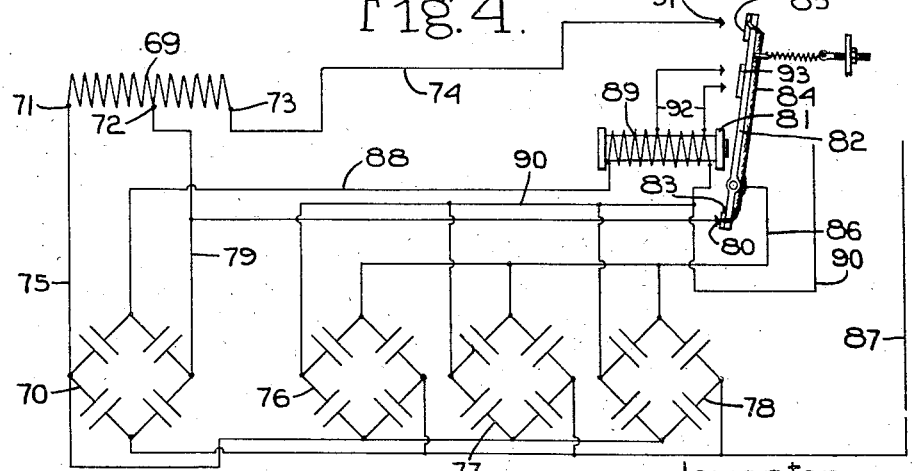

For certain load requirements, forms of apparatus shown in Figs. 3 and 4 are particularly adapted. In these forms of the invention, the rectifier is divided into two or more groups, one of which desirably is of relatively low current capacity and is supplied with an input current of relatively low voltage sufficient only to produce a relatively light load current in its output circuit. The output of this low capacity rectifier is connected to the main output circuit and may be utilized to supply the requirements of a light load. The remaining portion of the rectifier is adapted to supply an increased load current by an automatic switch. When an increased current drain is called for by the load, the increased current flowing in the small capacity rectifier operates the switch to impress the required voltage upon the large capacity section of the rectifier thereby to supply the required amount of current to a load.

Such apparatus may assume the particular embodiment shown diagrammatically in Fig. 3, in which a transformer 44 is inserted in the input circuit 45. The secondary 46 of the transformer is tapped at a plurality of points to provide a number of voltages to supply the requirements of various arrangements of the apparatus. As shown herein, the input of a low capacity rectifier group 47 is connected to the taps 48 and 49 of the transformer which provides a normal voltage to supply current to a light load which may be connected to the output circuit 50. The apparatus will function, however, without the light load. The reduced voltage supplied to the input of the rectifier 47 is obtained from a tap on the secondary of the transformer instead of by means of a voltage-reducing device such as that described in connection with Figs. 1 and 2.

A winding 51 upon a relay switch 52 is inserted in series in a wire 53 which acts to conduct rectified current from the rectifiers 47 and 56 to the output circuit 50. The other output terminal of the rectifier 47 is connected directly to the other conductor in the circuit 50 which is common to all the rectifiers. The relay switch 52 is provided with an armature 54 which is maintained in open-circuited position by means of an adjustable spring 55 when the load current is small.

The section 56 comprising a group of rectifiers connected in parallel is supplied with current at the full voltage of the secondary of the transformer 44. The input terminals 57 of this group are connected to the tap 48 of the transformer through the wire 58 while the input terminals 59 of the group are connected to the tap 60 of the transformer through the wire 61. The wire 61 is interrupted at 62 and the open ends of the wire are connected to a pair of contacts 63 on the relay 52. At light load, therefore, the large group 56 has no voltage impressed thereon due to the fact that the rectifier 47 is connected to an independent tap upon the transformer. The tension in the spring 55 is so adjusted that when the load current is increased above the normal current capacity of the rectifier 47, the armature is moved into its closed-circuited position, at which time the contacts 63 are bridged by the armature and current is supplied therethrough to the group of rectifiers 56. The rectifiers 56 therefore receive the full voltage of the secondary of the transformer which is designed to provide a normal voltage for the rectifiers when supplying rectified current to the known increased load.

In its closed-circuited position, the armature 54 acts also to bridge the contacts 64 upon the relay 52. The contacts 64 are connected to by-pass circuits 65. This by-pass circuit acts to short-circuit the portion 66 of the relay winding 51. The remaining portion 67 of the winding therefore acts alone to maintain the armature in its closed circuit position. It is a well known fact that it requires much less current to hold an armature in contact with its magnet pull than to initially attract it. It is due to this fact, therefore, that the armature remains in its closed circuit position against the action of the spring 55.

When the load current again decreases to a small value, the armature 52 is withdrawn by the spring 55 and the current is therefore removed from the rectifiers 56 and any remaining light load is supplied from the rectifier 47. The portion 67 of the winding 51 which acts to maintain the armature 52 in its closed-circuit position is so proportioned that the armature will positively move into open-circuit position under the action of the spring 55 when a desired minimum current is flowing in the output circuit. To provide for adjustment to accomplish this end, the winding 51 is tapped at a plurality of points 68. The group 56 of the rectifiers is thus positively protected from destructive voltage.

In the form of the invention shown in Fig. 4, the rectifier system is arranged automatically to be supplied with a low voltage when supplying current to loads having a number of current requirements. This form of the apparatus reduces the number of rectifying units required to secure the proper current capacity for the loads it is required to energize by interchanging connections on a plurality of groups of rectifiers constituting the rectifier system. The secondary 69 of a transformer is provided with a plurality of taps by means of which a plurality of voltages may be supplied to the input of the rectifier system. The input of the rectifier 70 is connected to taps 71 and 72 of the secondary 69 and is constantly supplied with a proper working low voltage therefrom. A high voltage tap 73 is connected to a wire 74 which conducts current to the rectifier system as required by the load in a manner to be hereinafter described. A greater number of voltages may be made available by means of the transformer or by other means to supply the requirements of other possible combinations of the elements of the apparatus within the scope of the invention.

The input wire 75 is connected to the secondary 69 at the tap 71 and is also connected to one of the input terminals of the rectifiers 70, 76, 77, and 78. These rectifiers may be a single unit or may be composed of a group of units. The wire 79 is permanently connected to the other input terminal of the rectifier 70. The wire 79 is also connected to a contact 80 on the relay switch 81. The switch 81 is shown in its open-circuited position, at which time the lower end of its armature 82 having a plate 83 thereon makes contact with the point 80. The plate 83 is insulated from the armature and is connected to a lead wire 84 secured to the armature and insulated therefrom. The wire 84 also is connected to an insulated metallic plate 85 at the upper end of the armature, the purpose of which will be subsequently described. The wire 84 is connected to a lead wire 86 which in turn is connected to the input terminals of the rectifiers 76, 77 and 78. With the armature of the relay switch in the position shown in the drawings, therefore, the rectifiers 70, 76, 77 and 78 are supplied with input voltage.

One output terminal of all of the rectifiers has a connection with a wire 87 which conducts current to the load. The other output terminals of the rectifiers 76, 77, and 78 are connected to the wire 90. The output wire 88 of the rectifier 70 is connected to one end of the winding 89 upon the switch 81. The other end of the winding 89 is connected to the wire 90 which conducts current to the load. Under the conditions above described a load may safely be supplied with current from a very light load up to the current capacity of the four rectifiers 70, 76, 77, and 78 when supplied with low voltage. When, however, the load calls for an increase in current above the proper working capacity of these rectifiers, the switch 81 is so adjusted that the current flowing in the winding 89 will then be sufficient to attract the armature 82 into closed circuit position. The first movement of the armature opens the circuit in the wire 86, thus de-energizing the rectifiers 76, 77, and 78. The rectifier 70 at this time continues momentarily to provide current to the load and acts also to continue the closing movement of the armature 82. When the armature is in closed position, the plate 85 engages the contact 91 which in turn conducts high voltage to the wire 84. High voltage current is conducted through the wire 84 to the wire 86 while the armature 82 is in closed circuit position, thus supplying high input voltage to the three rectifiers 76, 77 and 78. These rectifiers are therefore enabled to supply the increased current drain of the load. When the load current drops to a predetermined amount, the switch restores the system to the previously described condition, thereby protecting the rectifier system from excessive input voltage.

The winding 89 on the switch 81 has connected thereto a by-pass circuit 92 which embraces a portion thereof and is short-circuited by the metallic plate 93 when the armature 82 is in closed circuit position. By thus reducing the effective number of turns in the winding 89, the movement of the armature 82 into its open circuit position is made positive when the load current is reduced a predetermined amount. The circuit 92 and the plate 93 act in the same manner as the circuit 65 described in connection with Fig. 3.

By supplying a plurality of the sections of the rectifier system with a voltage sufficiently low to guard against injury to the plates of the rectifiers, as is done in the form of the invention shown in Fig. 4, a load may be supplied with current which requires a very small current or a load requiring current of a value up to the proper working capacity of the number of rectifier sections being supplied with low voltage input current. Loads requiring current values at all intermediate points between the extremes above mentioned are safely carried under these conditions. As previously stated, the further increase in load current is automatically supplied by the action of the relay switch 81. By adding more relay switches and more rectifiers, the scope of the apparatus may be indefinitely increased. In the specific form of the device shown in Fig. 4, three of the rectifier sections are supplied with low voltage current to supply the load with a relatively low amount of current and the same rectifier sections are also supplied with high voltage input current when the current drain is increased. The total number of rectifier units necessary safely to supply current to the load is thereby reduced. If it were not for the special voltage changing switching means, additional rectifiers would be necessary to provide adequate current range.

It will be noted that in Fig. 3 the output of all four of the rectifiers flows through the winding upon the relay switch 52. In Fig. 4, only the output of the rectifier 70 flows through the winding of the relay 81. The electrical characteristics of the apparatus may be adjusted to provide proper operation of the apparatus where connections either way in either of the types of apparatus disclosed in Figs. 3 and 4 are made. It may, however, be found in a particular case that the apparatus will function better with one connection than the other. By testing the apparatus both ways, the best operation may be found.

Having thus described the invention, what is claimed as new, and desired to be secured by Letters Patent, is:

1. Input voltage regulated rectifying apparatus comprising a full wave dry contact type rectifier system, a source of alternating current having input connection therewith, a predetermined load having output connection therewith and correlated with said system and current source to be energized thereby without exceeding the safe working capacity of the said system, automatic switching means constantly energized by current from said input connection and acting, when the said predetermined load is de-energized which tends to cause a destructive voltage to be impressed upon said rectifier system, to reduce the said voltage to a safe amount and acting, when the load is re-energized, to restore the voltage impressed upon the rectifier system to the amount necessary for the energization of the load.

2. Input voltage regulated rectifying apparatus comprising a full wave dry contact type rectifier system, a source of alternating current, an input circuit connecting said source to said system, a predetermined load having output connection with said system, a resistance of sufficient capacity when included in the input circuit to prevent the impressment of a destructive voltage upon said rectifier system when the load is de-energized, and an automatic relay switch having a winding constantly receiving current from said input circuit, the said switch acting, when the load is de-energized, to include said resistance in the input circuit and acting, when the load is re-energized, to short-circuit said resistance and thus restore the voltage impressed upon the rectifier system to the amount necessary for the energization of the load.

3. Input voltage regulated rectifying apparatus comprising a full wave dry contact type rectifier system, a source of alternating current, an input circuit connecting said source with said rectifier system, a predetermined load, an output circuit acting to conduct rectified current from said rectifier system to said load, voltage reducing means operable when included in said input circuit to prevent the impressment of a destructive voltage upon said rectifier system, an automatic relay switch having a winding constantly receiving current from said input circuit, the said switch acting, when the load is de-energized to include said voltage reducing means in said input circuit and acting, when the load is re-energized, to short-circuit said resistance and thus restore the voltage impressed upon the rectifier system to the amount necessary for the energization of the load, and a second winding upon said relay switch receiving current from said output circuit and acting to insure that said switch will maintain said voltage reducing means short-circuited until the load is de-energized.

4. Input voltage regulated rectifying apparatus comprising a full wave dry contact type rectifier system, a source of alternating current, an input circuit connecting said source to said rectifier, a predetermined load, an output circuit acting to conduct the rectified current from the rectifier system to said predetermined load, voltage reducing means operable when included in said input circuit to prevent the impressment of a destructive voltage upon said rectifier system, an automatic relay switch having a winding thereon constantly receiving current from said input circuit, independent rectifying means acting to rectify the current flowing through said switch, said winding acting, when the load is de-energized, to include said voltage reducing means in said input circuit and acting, when the load is re-energized, to short-circuit said voltage reducing means and thus restore the voltage impressed upon said rectifier system to the amount necessary for the energization of the load, and a second winding upon said automatic switch receiving current from said output circuit and acting to insure that said switch will maintain said voltage reducing means short-circuited until the load is de-energized.

5. Input voltage regulated rectifying apparatus comprising a full wave dry contact type rectifier system, a source of alternating current having a main input connection and a constantly energized auxiliary input connection therewith, a load having a main output connection and an auxiliary output connection therewith and correlated with said system and said source to be energized thereby without exceeding the safe working capacity of the said system, and an automatic switch having a winding thereon receiving current from said auxiliary output connection and acting, when the load is de-energized or the load current is so reduced as to cause a destructive voltage to be impressed upon said rectifier system, to de-energize the main input connection and acting when the load is re-energized to energize the main input connection thereby to impress upon the rectifier system the voltage necessary for the energization of the load.

6. Input voltage regulated rectifying apparatus comprising the elements defined in claim 5 together with a by-pass circuit embracing a portion of the winding on the automatic switch said circuit being opened and closed by the switch simultaneously with the de-energization and energization of the main input circuit.

7. Input voltage regulated rectifying apparatus comprising full wave dry contact type rectifier system having a plurality of sections, a source of alternating current having input connection therewith, said input connection having a plurality of voltage connections of different electrical pressure, one of such connections acting constantly to energize one of said sections with low voltage input current, an output connection common to all of the sections of the rectifier system and acting to conduct rectified current to the load, automatic switching means acting throughout a predetermined range of low output current values to impress a low voltage upon one or more sections of the rectifier system in addition to the constantly energized section thereof and acting, when the output current exceeds the maximum low current value to impress a higher voltage upon all of the rectifier sections except the constantly energized section.

8. Input voltage regulated rectifying apparatus comprising a full wave dry contact type rectifier system, a source of alternating current having input connection therewith, said input connection having a plurality of voltage connections of different electrical pressures, an output connection acting to conduct rectified current to the load, automatic switching means having a winding thereon receiving current from said output connection and actuated by a change in the value of current in the output circuit to impress upon the input of the rectifier system the voltage from a selected input voltage connection which is proportioned to the output current to prevent impressment of excessive voltage on the rectifier system and to secure the required current in the output circuit and a by-pass circuit embracing a portion of said winding, said by-pass circuit being opened and closed by said automatic switching means simultaneously with respectively a decrease and an increase in the load current.

9. Input voltage regulated rectifying apparatus comprising a full wave dry contact type rectifier system, a source of alternating current having input connection therewith, a load having output connection therewith and correlated with said system and current source to be energized thereby without exceeding the safe working capacity of the said system, characterized by automatic switching means having a coil in said input circuit and constantly energized by current in said circuit, said switching means acting, when the load is deenergized to the extent which would cause a destructive voltage to be impressed upon said rectifier system, to reduce the input voltage to a safe amount and acting, when the load is reenergized, to restore the voltage impressed upon the rectifier system to the amount necessary for the energization of the load, and a second coil upon said switching means situated in said output connection acting to maintain said switching means in its closed circuit position while the load is energized.

JOHN J. HANLEY.